(12) United States Patent
Pierson (10) Patent No.: US 12,381,450 B1
(45) Date of Patent: Aug. 5, 2025

(54) SUBTERRANEAN ELECTRICITY-GENERATING SYSTEM

(71) Applicant: Raymond Marvin Pierson, Windsor, CO (US)

(72) Inventor: Raymond Marvin Pierson, Windsor, CO (US)

( * ) Notice: Subject to any disclaimer, the term of this patent is extended or adjusted under 35 U.S.C. 154(b) by 0 days.

(21) Appl. No.: 19/056,255

(22) Filed: Feb. 18, 2025

(51) Int. Cl.
*H02K 7/18* (2006.01)
*E21B 41/00* (2006.01)
*H02K 16/00* (2006.01)

(52) U.S. Cl.
CPC ........... *H02K 7/1807* (2013.01); *E21B 41/00* (2013.01); *H02K 16/00* (2013.01); *H02K 2213/12* (2013.01)

(58) Field of Classification Search
CPC ...... H02K 7/18; H02K 7/1807; H02K 7/1823; H02K 7/1853; H02K 7/1861; H02K 16/02; H02K 16/04; H02K 2213/12; E21B 41/0085
See application file for complete search history.

(56) References Cited

U.S. PATENT DOCUMENTS

| | | | |
|---|---|---|---|
| 2,870,841 | A | 1/1959 | Conrad et al. |
| 3,042,808 | A * | 7/1962 | Jackson ............... H02K 7/1861 290/1 R |
| 3,264,994 | A | 8/1966 | Leutwyler |
| 4,134,707 | A | 1/1979 | Ewers |
| 6,840,109 | B2 | 1/2005 | Drahm et al. |
| 6,848,503 | B2 | 2/2005 | Schultz et al. |
| 6,857,846 | B2 | 2/2005 | Miller |
| 7,537,051 | B1 | 5/2009 | Hall et al. |
| 8,022,561 | B2 | 9/2011 | Ciglenec et al. |
| 8,040,011 | B2 | 10/2011 | Mueller et al. |
| 8,957,538 | B2 | 2/2015 | Inman et al. |
| 9,222,461 | B2 | 12/2015 | Aranovich et al. |
| 9,879,506 | B2 | 1/2018 | Frosell et al. |
| 10,174,762 | B1 | 1/2019 | Chen et al. |
| 10,605,057 | B2 * | 3/2020 | Huynh ................. F04D 13/024 |
| 2009/0058098 | A1 | 3/2009 | Flynn |

(Continued)

FOREIGN PATENT DOCUMENTS

| | | |
|---|---|---|
| GB | 2507200 A | 4/2014 |
| JP | 2004301087 A * | 10/2004 |
| WO | WO 2012/118491 A1 | 9/2012 |

OTHER PUBLICATIONS

Kimura, Machine Translation of JP2004301087, Oct. 2004 (Year: 2004).*

*Primary Examiner* — Eric Johnson
(74) *Attorney, Agent, or Firm* — Craig R. Miles; CR MILES P.C.

(57) ABSTRACT

A subterranean electricity-generating system, and methods of making and using the same, whereby the system includes a first generator comprising a first generator rotor and a first generator stator, a second generator comprising a second generator rotor and a second generator stator, and a rotatable shaft operably coupled to the first generator rotor and the second generator rotor to drive rotation thereof. The shaft has a vertical rotation axis, whereby rotation of the shaft drives rotation of the first generator rotor relative to the first generator stator to induce a first electric current, and whereby rotation of the shaft drives rotation of the second generator rotor relative to the second generator stator to induce a second electric current.

15 Claims, 11 Drawing Sheets

(56) References Cited

U.S. PATENT DOCUMENTS

| | | | |
|---|---|---|---|
| 2011/0121576 A1* | 5/2011 | Bayko | F03D 15/10 |
| | | | 290/55 |
| 2015/0034294 A1* | 2/2015 | Miles | E21B 47/13 |
| | | | 166/66.5 |
| 2018/0038203 A1* | 2/2018 | Deolalikar | E21B 41/0085 |
| 2018/0223632 A1* | 8/2018 | Rajagopalan | H02K 7/18 |
| 2019/0128567 A1 | 5/2019 | Redfern | |
| 2022/0320959 A1* | 10/2022 | Martins Aguiar | H02K 5/203 |

* cited by examiner

SUBTERRANEAN ELECTRICITY-GENERATING SYSTEM

I. SUMMARY OF THE INVENTION

A broad object of a particular embodiment of the invention can be to provide a subterranean electricity-generating system, and methods of making and using the same, whereby the system includes a first generator comprising a first generator rotor and a first generator stator, a second generator comprising a second generator rotor and a second generator stator, and a rotatable shaft operably coupled to the first generator rotor and the second generator rotor to drive rotation thereof. The shaft has a vertical rotation axis, whereby rotation of the shaft drives rotation of the first generator rotor relative to the first generator stator to induce a first electric current, and whereby rotation of the shaft drives rotation of the second generator rotor relative to the second generator stator to induce a second electric current.

Naturally, further objects of particular embodiments of the invention are disclosed throughout other areas of the specification, drawings, and claims.

III. DETAILED DESCRIPTION OF THE PREFERRED EMBODIMENTS

Figure 1:
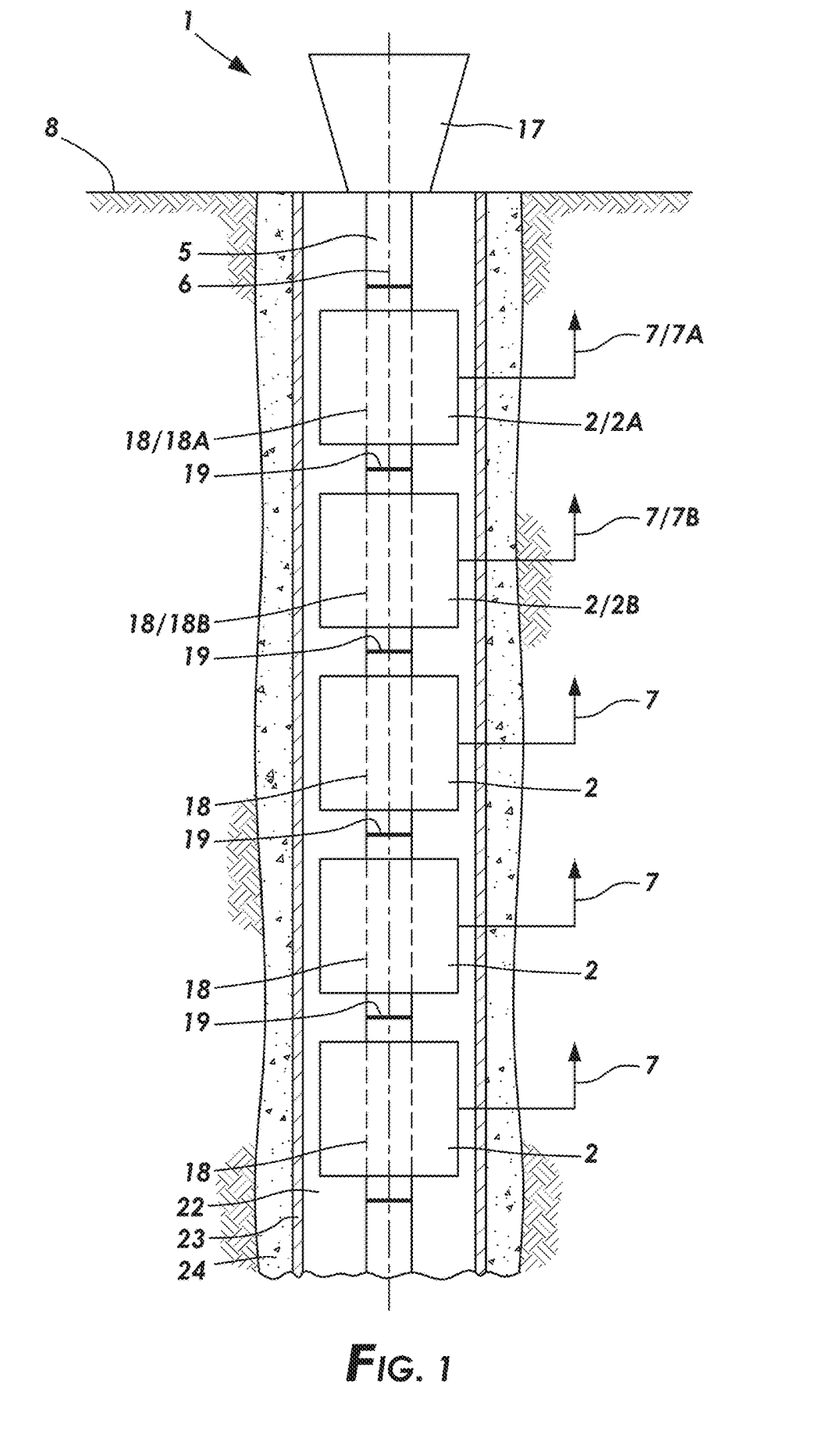
FIG. 1 is an illustration of an embodiment of the present subterranean electricity-generating system including a plurality of generators disposed underground.
Figure 2A:
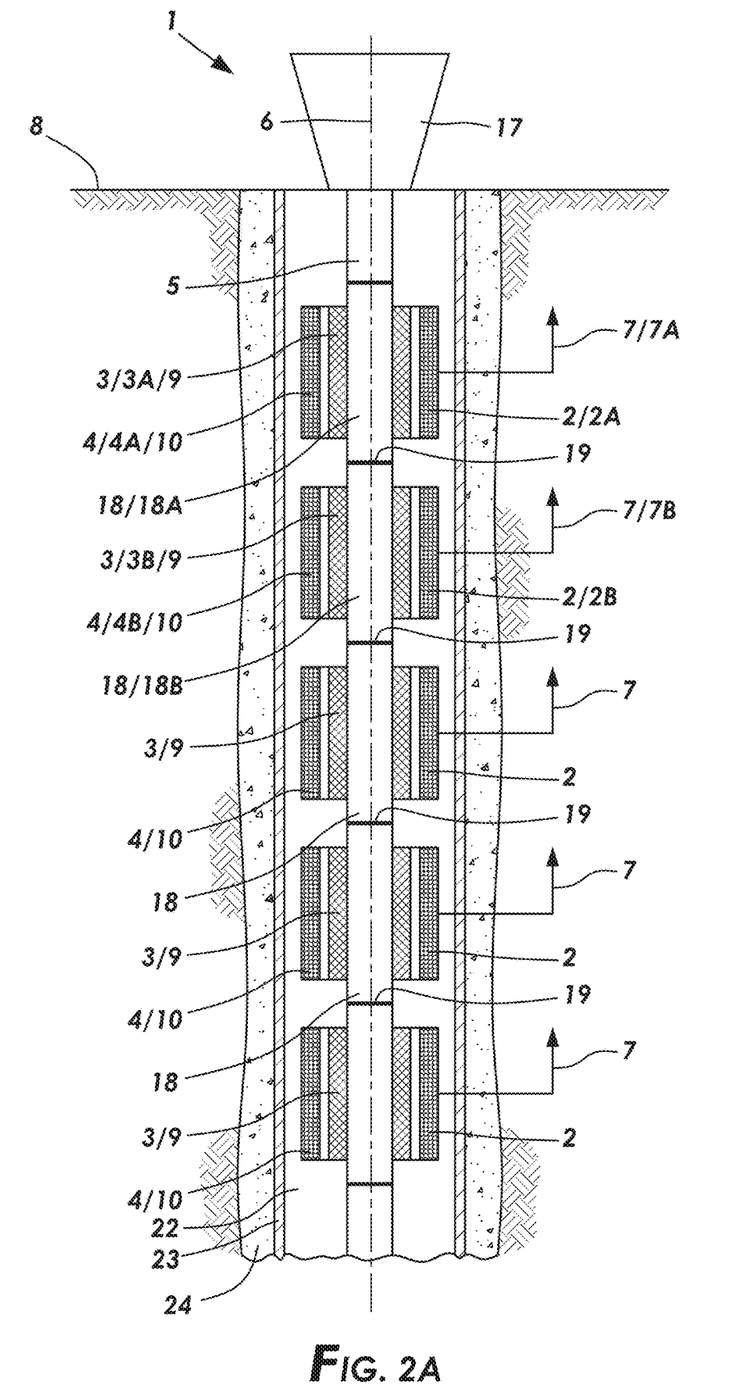
FIG. 2A is an illustration of an embodiment of the present subterranean electricity-generating system, whereby the rotors comprise magnets and the stators comprise coils.
Figure 2B:
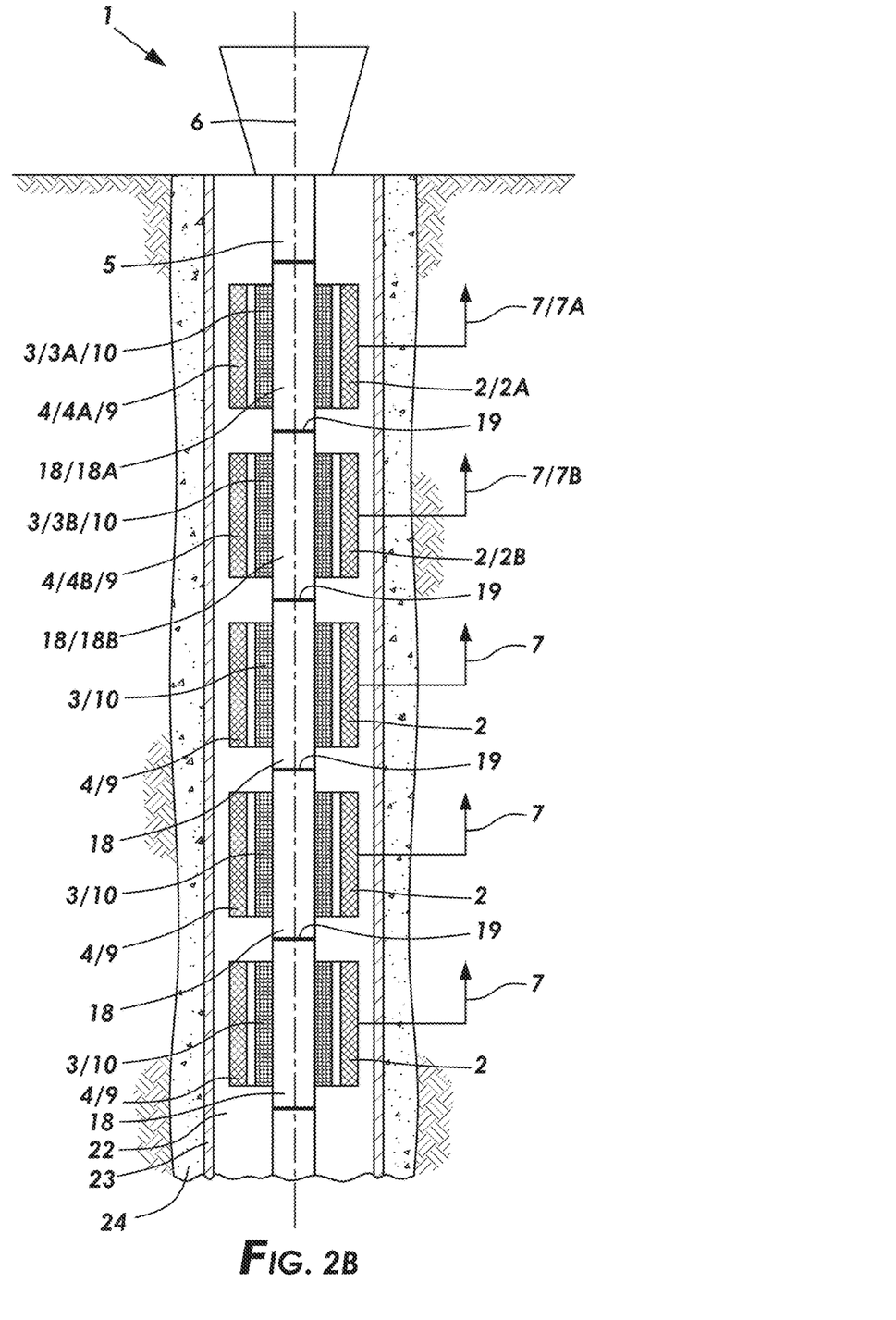
FIG. 2B is an illustration of an embodiment of the present subterranean electricity-generating system, whereby the rotors comprise coils and the stators comprise magnets.

Now referring primarily to FIGS. 1, 2A, and 2B which illustrate novel systems (1) for subterranean electricity generation, whereby each system (1) includes a plurality of generators (2) and in particular, at least a first generator (2A) having a first generator rotor (3A) and a first generator stator (4A), and a second generator (2B) having a second generator rotor (3B) and a second generator stator (4B). The subterranean electricity generating system (1) further includes a rotatable shaft (5) operably coupled to the first generator rotor (3A) and the second generator rotor (3B) to drive rotation thereof, whereby the shaft (5) comprises a vertical rotation axis (6). Rotation of the shaft (5) drives rotation of the first generator rotor (3A) relative to the first generator stator (4A) to induce a first electric current (7A). Additionally, rotation of the shaft (5) drives rotation of the second generator rotor (3B) relative to the second generator stator (4B) to induce a second electric current (7B). Significantly, the first and second generators (2A)(2B) can be configured for subterranean location and operation.

For the purposes of the present invention, the term "subterranean" can mean under, below, or beneath a ground surface (8), such as the surface of the earth, whereby synonyms may include underground, belowground, subsurface, or the like.

As to particular embodiments, the present subterranean electricity-generating system (1) can be considered modular or a whole made up of a plurality of separate parts that when combined, provide the whole. Following, the subterranean electricity-generating system (1) can comprise a plurality of generators (2), such as at least a first generator (2A) and a second generator (2B), that when combined, provide the system (1). Advantageously, the modular subterranean electricity-generating system (1) can allow flexibility and customization, as generators (2) may be added, removed, and/or rearranged based upon desired output (for example, based upon consumer demand), such as wanted kilowatts. Thus, the modular subterranean electricity-generating system (1) can be scalable such that generators (2) may be incrementally added or removed to increase or decrease, respectively, the generation of electricity by the subterranean system (1). In addition, modular parts can be standardized, making them easier to manufacture, replace, and upgrade.

Generator

A generator (2) of the present subterranean electricity-generating system (1) can include a rotor (3) and a stator (4), whereby a plurality of generators (2) may be combined, such as vertically stacked, to generate electricity. The following description of the instant invention firstly details one instance of a generator (2) which generates electricity and secondly details the combination of a plurality of generators (2) to generate additional electricity.

Figure 3:
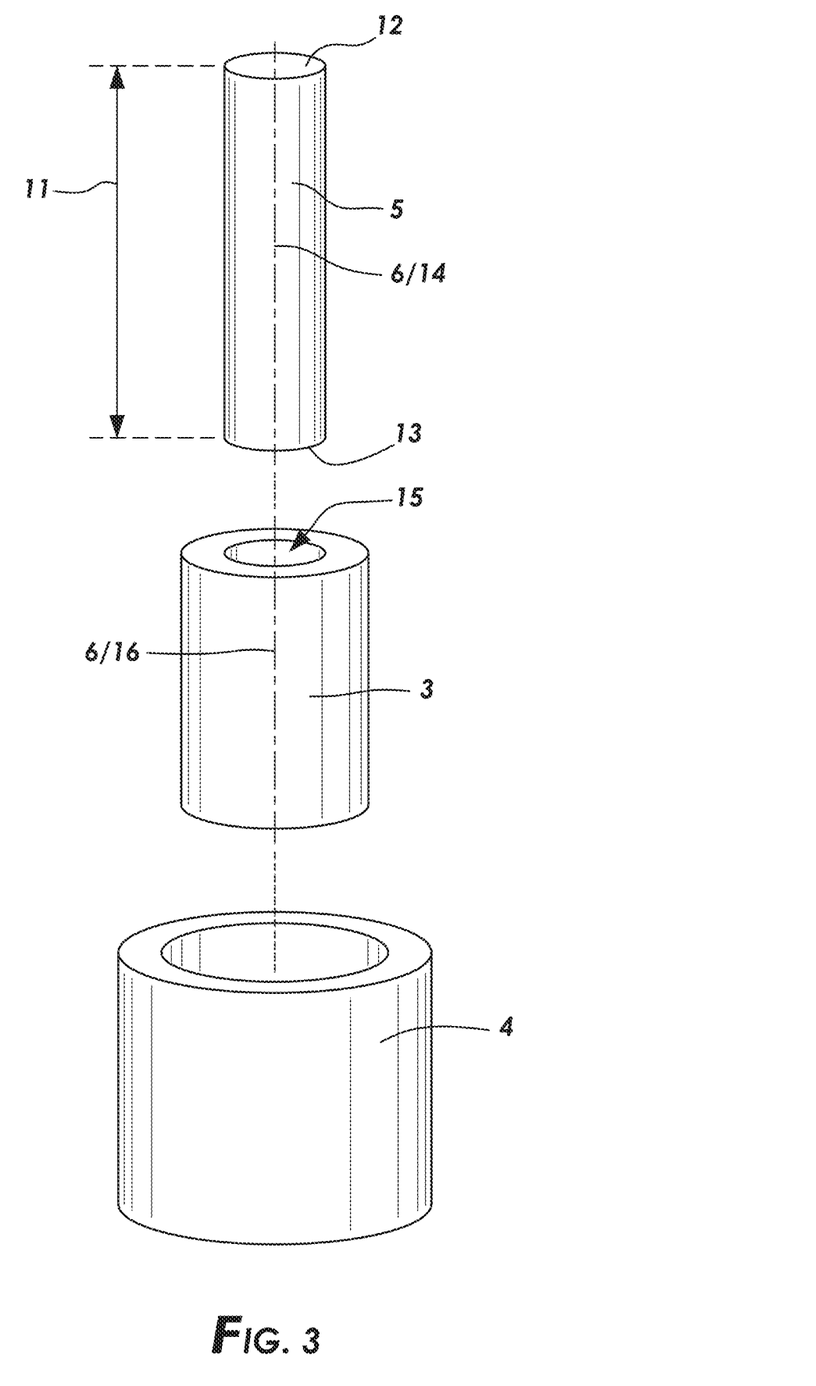
FIG. 3 is an exploded illustration of a generator of the present subterranean electricity-generating system.
Figure 4A:
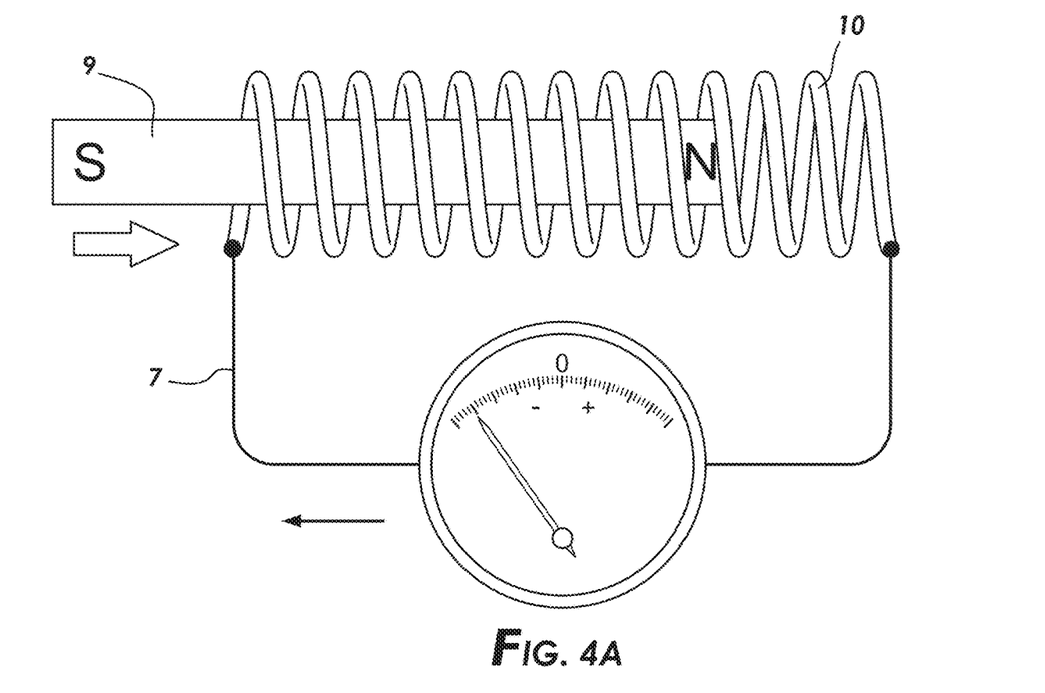
FIG. 4A is an illustration of electricity generation via movement a magnet relative to a coil in a first direction which is toward the right.
Figure 4B:
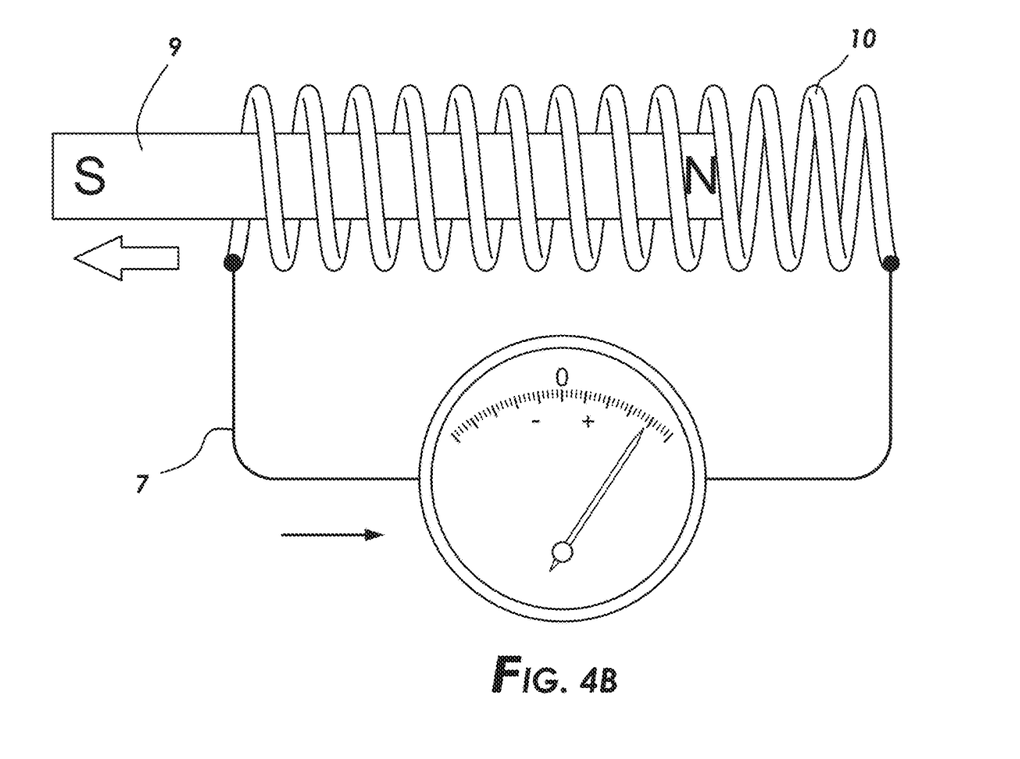
FIG. 4B is an illustration of electricity generation via movement a magnet relative to a coil in a second direction which is toward the left.

Now referring primary to FIG. 3, an instant generator (2) includes a container defining an interior volume in which is disposed (i) a stator (4), which can be a stationary part of the generator (2), and (ii) a rotor (3), whereby the rotor (3) may be rotatable relative to the stator (4). As to particular embodiments, the rotor (3) and the stator (4) can be concentric, whereby the stator (4) may dispose radially outwardly from the rotor (3) with a gap (such as but not limited to an air gap) therebetween. The generator (2) can convert mechanical energy in the form of rotation of the rotor (3) into electrical energy via the principle of electromagnetic induction or the generation of an electromotive force (EMF) or voltage across an electrical conductor in a changing magnetic field (as shown in FIGS. 4A and 4B). Simply, when an electrical conductor (such as a wire) is placed in a magnetic field and that field changes, it induces a voltage in the conductor. This voltage can then cause an electric current to flow through the conductor. In more detail, the induced voltage exerts a force on the free electrons in the conductor, thereby causing them to move and thereby induces an electric current.

For the purposes of the present invention, the term "magnetic field" can mean the space proximate a magnetic body or an electric current-carrying body in which magnetic forces generated by the body may be present. In a magnetic field, magnetic field lines or lines of magnetic force can be directed toward and away from magnetic poles, for example away from the north magnetic pole and toward the south magnetic pole.

For the purposes of the present invention, the term "magnet" can mean a material that may produce a magnetic field. A magnet (9) can be a permanent magnet, which may be made from a material that is magnetized and generates a persistent magnetic field. Also, a magnet (9) can be a temporary magnet capable of generating a transient magnetic field, whereby a temporary magnet may be made from a material that becomes magnetized when it is placed within a relatively strong magnetic field or exposed to an electric current.

As to particular embodiments, one of the rotor (3) or the stator (4) can comprise at least one magnet (9) (or a plurality of magnets, which may be disposed in circumferentially spaced-apart relation) and the other can correspondingly comprise at least one coil (10) of conductive wire (winding) (or a plurality of coils, which may be disposed in circumferentially spaced-apart relation) that can dispose around a metal core (armature), such as iron or steel. To generate electricity, the key is relative motion between the magnet (9) and the coil (10); hence, the magnet (9) can be coupled to the rotor (3) and rotate relative to a stationary coil (10), or the coil (10) may be coupled to the rotor (3) and rotate relative to a stationary magnet (9).

Figure 5A:
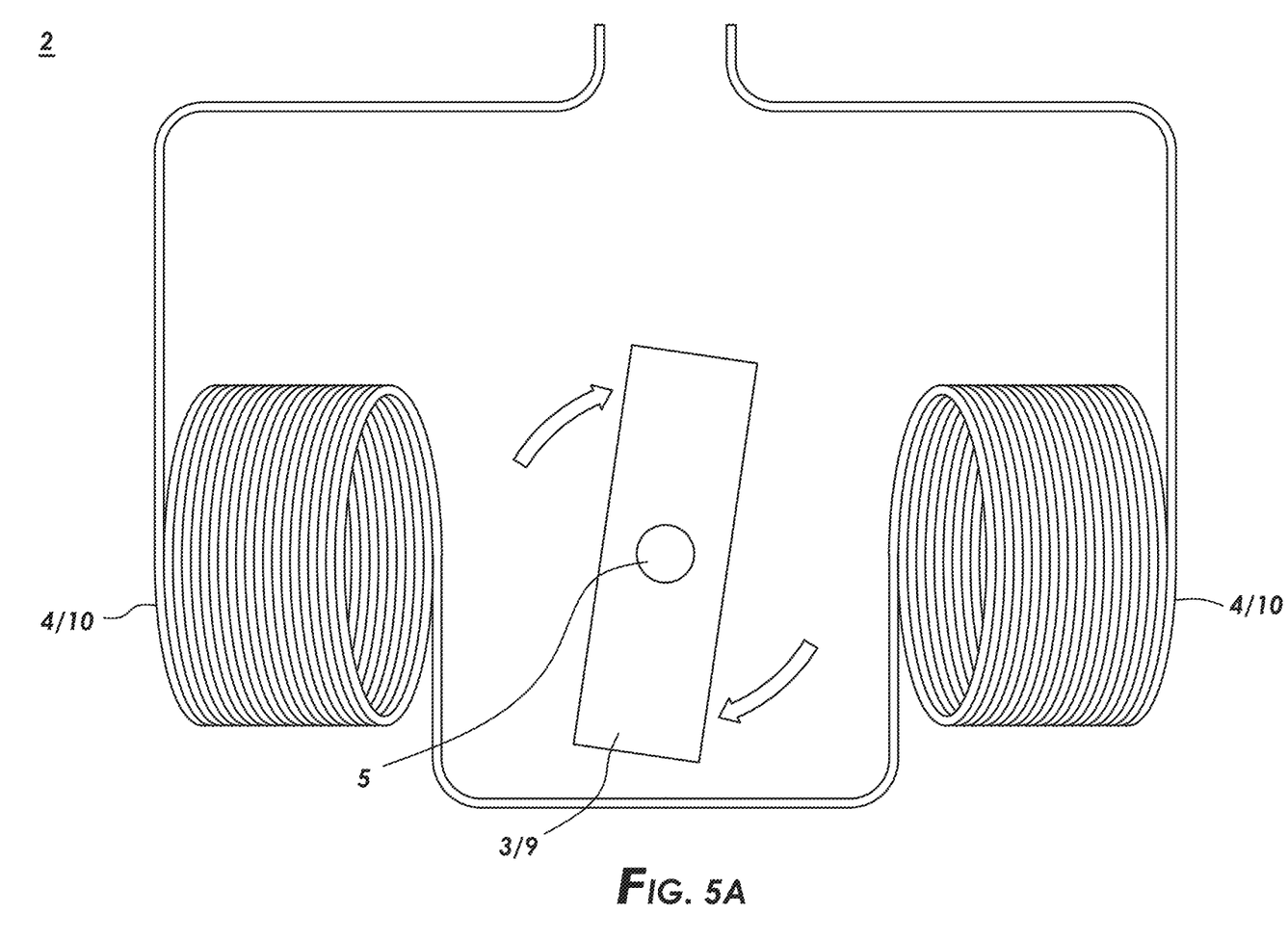
FIG. 5A is an illustration of a generator of the present subterranean electricity-generating system, whereby the rotor comprises a magnet which moves relative to a stationary coil.
Figure 6A:
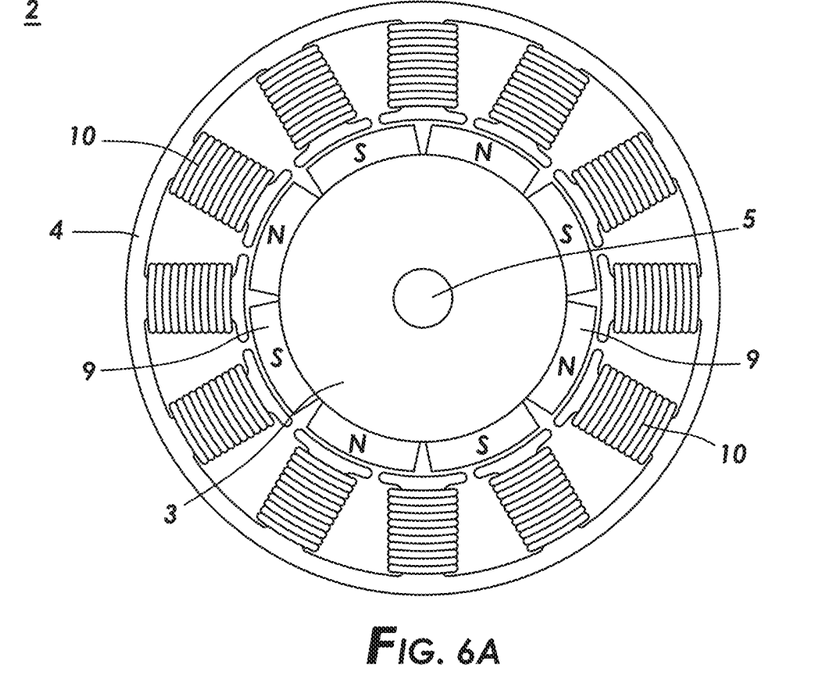
FIG. 6A is an illustration of a generator of the present subterranean electricity-generating system, whereby the rotor comprises a magnet which moves relative to a stationary coil.
Figure 6B:
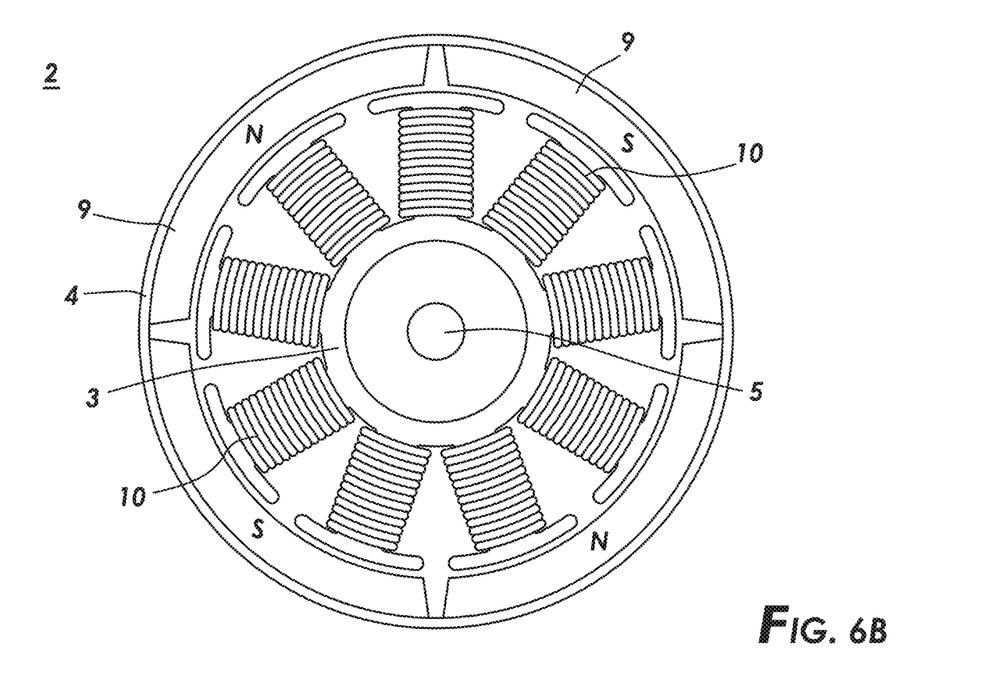
FIG. 6B is an illustration of a generator of the present subterranean electricity-generating system, whereby the rotor comprises a coil which moves relative to a stationary magnet.

Now referring primarily to FIGS. 2A, 5A, and 6A, as to particular embodiments, the magnet (9) can be coupled to the rotor (3) and rotate relative to a stator (4) which includes a coil (10). The magnet (9), such as a permanent magnet, can be mechanically rotated; rotation of the magnet (9) creates a changing magnetic field which cuts through the coil (10) to induce a voltage and generate an electric current in the coil (10). A variety of configurations of generators (2) with a rotor (3) comprising a magnet (9) and a stator (4) comprising a coil (10) are known to those of ordinary skill in the art and can be useful with the present invention. As but one illustrative example, the generator (2) can be configured as an axial flux generator.

Now referring primarily to FIGS. 2B, 5B through 5E, and 6B, as to particular embodiments, the coil (10) can be coupled to the rotor (3) and rotate relative to a stator (4) which includes a magnet (9), such as a permanent magnet or an electromagnet. The coil (10) can be mechanically rotated within the magnetic field; as the coil (10) rotates, the magnetic field which cuts through it changes, thus inducing a voltage and generating an electric current in the coil (10). A variety of configurations of generators (2) with a rotor (3) comprising a coil (10) and a stator (4) comprising a magnet (9) are known to those of ordinary skill in the art and can be useful with the present invention. As but one illustrative example, the generator (2) can be configured as a homopolar generator.

Now referring primarily to FIGS. 3 and 5A through 6B, the rotor (3) can be coupled to a rotatable shaft (5), whereby in operation, mechanical rotation of the shaft (5) drives rotation of the rotor (3) relative to the stator (4) to induce an electric current. The shaft (5) can be configured as a substantially linear elongate member having any suitable cross-section, such as a circular cross-section, a hexagonal cross-section, a polygonal cross-section, or the like. The shaft (5) can include a shaft length (11) disposed between opposing shaft first and second ends (12)(13). A shaft longitudinal axis (14) can pass through the shaft first and second ends (12)(13) such that the shaft longitudinal axis (14) disposes parallel to or along the shaft length (11). A variety of configurations of rotatable shafts (5) are known to those of ordinary skill in the art and can be useful with the present invention.

For operable coupling, the rotor (3) can include an axially-disposed rotor pass-through (15) (which may be centrally located) through which the shaft (5) can extend along a rotor pass-through axis (16) to dispose the rotor (3) radially about the shaft (5) and specifically, radially about the shaft longitudinal axis (14). As to particular embodiments, the rotor pass-through axis (16) can be coincident with the shaft longitudinal axis (14). A variety of means of coupling, such as fixedly coupling, a shaft (5) to a rotor (3) such that rotation of the shaft (5) drives rotation of the rotor (3) are known to those of ordinary skill in the art and can be useful with the present invention.

In use, the shaft (5) can be vertically-oriented, meaning that the shaft length (11) can dispose vertically (or at about 90° or about −90°) relative to a horizontal reference plane (which disposes at about 0°). As to particular embodiments, the ground surface (8) can provide the horizontal reference plane. Accordingly, in use, the shaft (5) can rotate about a vertical rotation axis (6), which may be in contrast to a shaft (5) which rotates about a horizontal rotation axis. As to particular embodiments, the vertical rotation axis (6) can be parallel to the shaft longitudinal axis (14). As to particular embodiments, the vertical rotation axis (6) can be coincident with a shaft central longitudinal axis (14) which passes axially through the center of the shaft first and second ends (12)(13).

As the shaft (5) drives rotation of the rotor (3), the rotor (3) can also rotate about the vertical rotation axis (6). As to particular embodiments, the vertical rotation axis (6) can be parallel to the rotor pass-through axis (16). As to particular embodiments, the vertical rotation axis (6) can be coincident with a rotor pass-through central axis (16) which passes axially through the center of the rotor pass-through (15) and the rotor (3).

The shaft (5) can be rotated to drive rotation of the rotor (3) relative to the stator (4) to induce an electric current by a numerous and wide variety of drivers or power sources (17). As to particular embodiments, the driver (17) can be automatically powered. As but one illustrative example, the driver (17) can comprise a motor, such as an electric motor, a pneumatic motor, a hydraulic motor, or the like. As but a second illustrative example, the driver (17) can comprise an engine, such as an internal combustion engine, an external combustion engine, or the like. As but a third illustrative example, the driver (17) can comprise a renewable energy source, such as but not limited to solar energy, wind energy, hydroelectric power, geothermal energy, bioenergy, tidal and wave energy, or the like. As but a fourth illustrative example, the driver (17) can comprise nuclear energy. As but a fifth illustrative example, the driver (17) can be a gravity-based energy source, such as hydroelectric power, a gravity energy storage system (GESS), or the like. As to particular embodiments, the driver (17) can be manually powered, such as via a hand crank, lever, or the like.

As to particular embodiments, a first portion of the electricity generated by the generators (2) of the present system (1) can drive rotation of the shaft (5) and correspondingly, the rotor (3); the second portion of the electricity generated by the generators (2) of the present system (1) can be used to meet desired performance demands.

The generator (2), the rotor (3), the stator (4), and the shaft (5) can have any of a numerous and wide variety of practical configurations and dimensions (such as width, diameter, length, height, etc.), depending upon the embodiment. As but one illustrative example, a generator (2) including its rotor (3) and stator (4) can have a height of about 10 feet to about 40 feet.

Figure 5B:
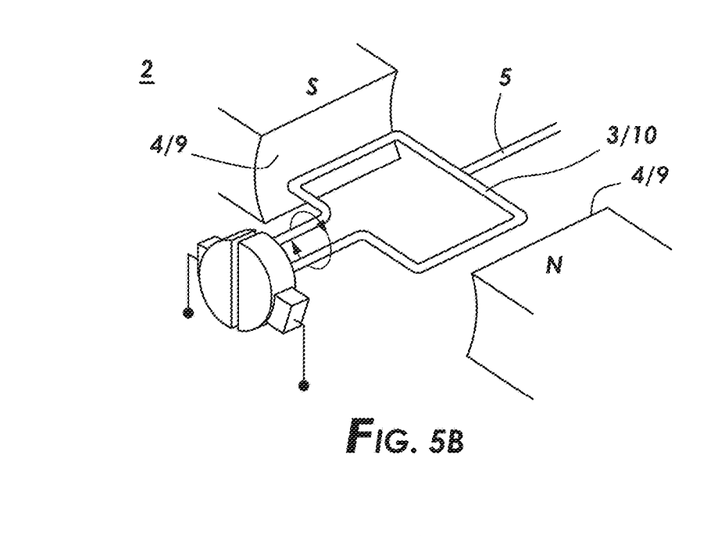
FIG. 5B is an illustration of a generator of the present subterranean electricity-generating system, whereby the rotor comprises a coil which moves relative to a stationary magnet to generate direct current.
Figure 5C:
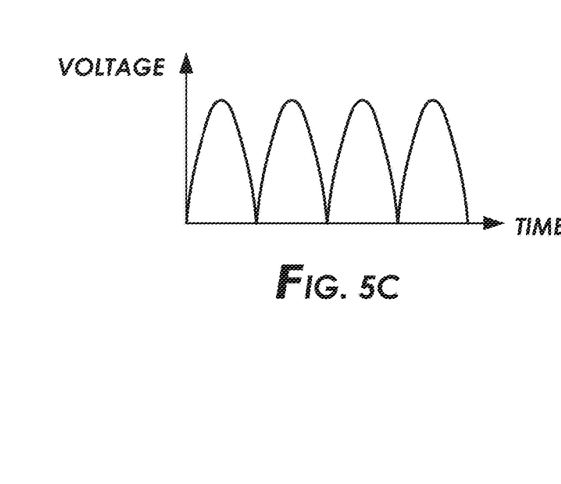
FIG. 5C is a graphical depiction of voltage over time for the generator configuration shown in FIG. 5B.

As to particular embodiments, the present generator (2) can generate direct current (DC) or a flow of electrons in one direction, such as but not limited to via the configuration shown in FIG. 5B.

Figure 5D:
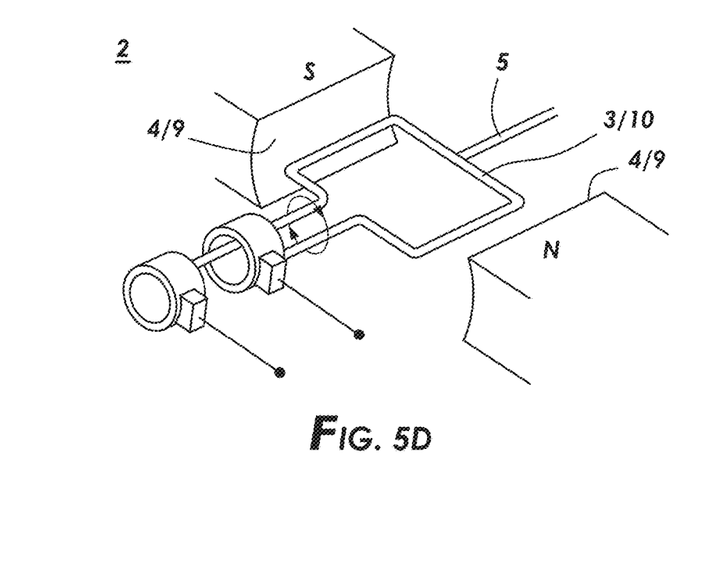
FIG. 5D is an illustration of a generator of the present subterranean electricity-generating system, whereby the rotor comprises a coil which moves relative to a stationary magnet to generate alternating current.
Figure 5E:
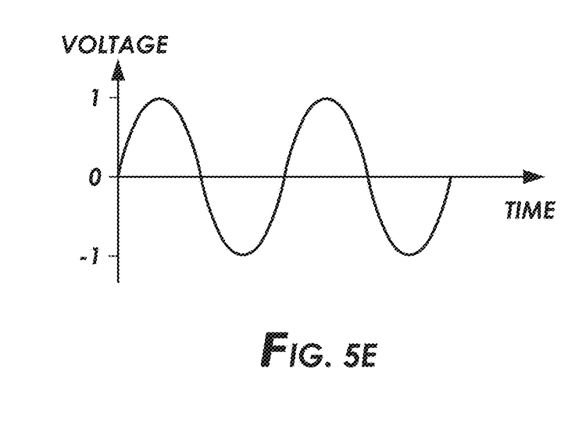
FIG. 5E is a graphical depiction of voltage over time for the generator configuration shown in FIG. 5D.

As to particular embodiments, the present generator (2) can generate alternating current (AC) or a flow of electrons that periodically reverses direction, such as but not limited to via the configuration shown in FIG. 5D.

Figure 7A:
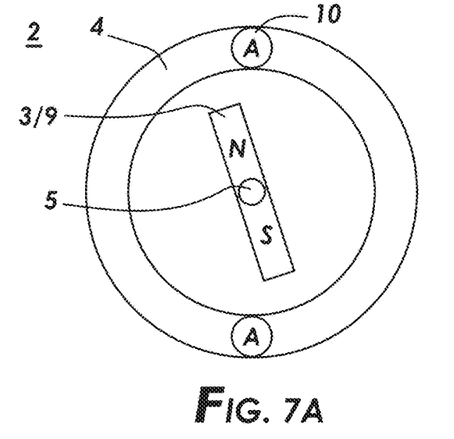
FIG. 7A is an illustration of a generator configuration for generating single phase electricity.
Figure 7B:
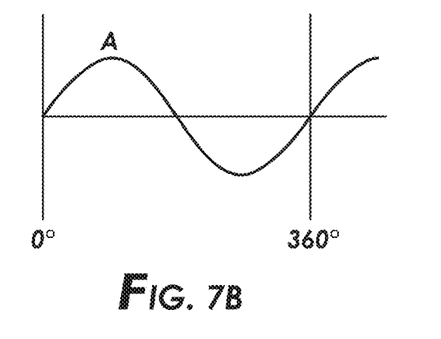
FIG. 7B is a graphical depiction of the single phase electricity generated via the generator configuration shown in FIG. 7A.

As to particular embodiments, the present generator (2) can generate single phase electrical power (as shown in FIG. 7B), such as but not limited to via the configuration shown in FIG. 7A.

Figure 7C:
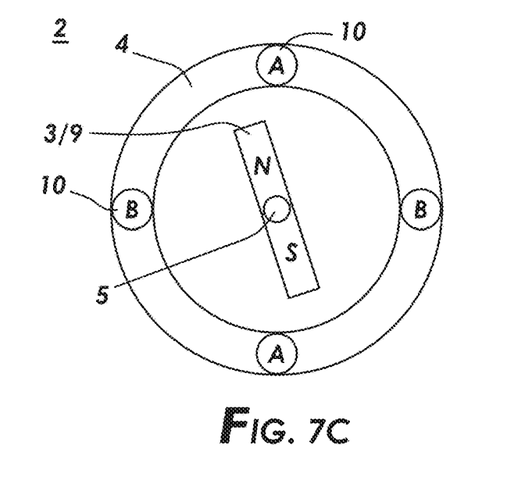
FIG. 7C is an illustration of a generator configuration for generating two phase electricity.
Figure 7D:
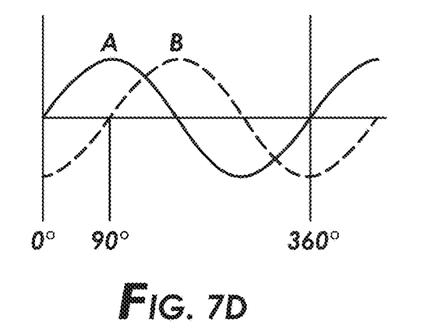
FIG. 7D is a graphical depiction of the two phase electricity generated via the generator configuration shown in FIG. 7C.

As to particular embodiments, the present generator (2) can generate two phase electrical power (as shown in FIG. 7D), such as but not limited to via the configuration shown in FIG. 7C.

Figure 7E:
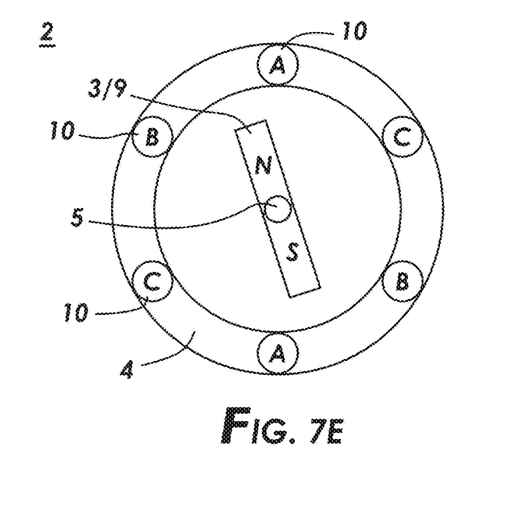
FIG. 7E is an illustration of a generator configuration for generating three phase electricity.
Figure 7F:
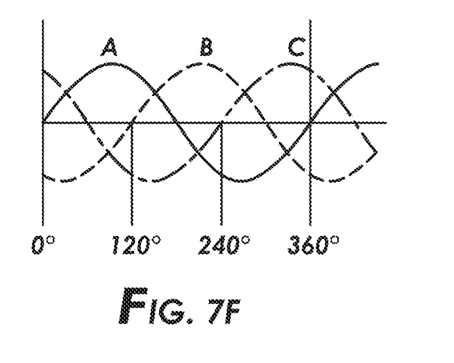
FIG. 7F is a graphical depiction of the three phase electricity generated via the generator configuration shown in FIG. 7E.

As to particular embodiments, the present generator (2) can generate three phase electrical power (as shown in FIG. 7F), such as but not limited to via the configuration shown in FIG. 7E.

Plurality of Generators

As stated above, the present subterranean electricity-generating system (1) can include a plurality of generators (2) which may be combined to generate electricity. For example, the subterranean electricity-generating system (1) can include at least (i) a first generator (2A) having a first generator rotor (3A) which rotates relative to a first generator stator (4A), and (ii) a second generator (2B) having a second generator rotor (3B) which rotates relative to a second generator stator (4B). Rotation of the shaft (5) can drive rotation of both the first generator rotor (3A) and the second generator rotor (3B) to induce a first electric current (7A) and a second electric current (7B), respectively.

As to particular embodiments, a shaft (5) can be coupled, directly coupled, connected, or directly connected to the first and second generator rotors (3A)(3B) to drive rotation thereof, whereby the shaft (5) may be structurally continuous between opposing shaft first and second ends (12)(13) or, said another way, the shaft (5) can have a continuous shaft length (11) between opposing shaft first and second ends (12)(13) or, said another way, the shaft (5) may extend uninterrupted between opposing shaft first and second ends (12)(13). The shaft length (11) can extend through the rotor pass-throughs (15) of the first generator rotor (3A) and the second generator rotor (3B). As the shaft (5) can be continuous, rotation thereof may drive simultaneous or concurrent rotation of the first and second generator rotors (3A)(3B).

Figure 9A:
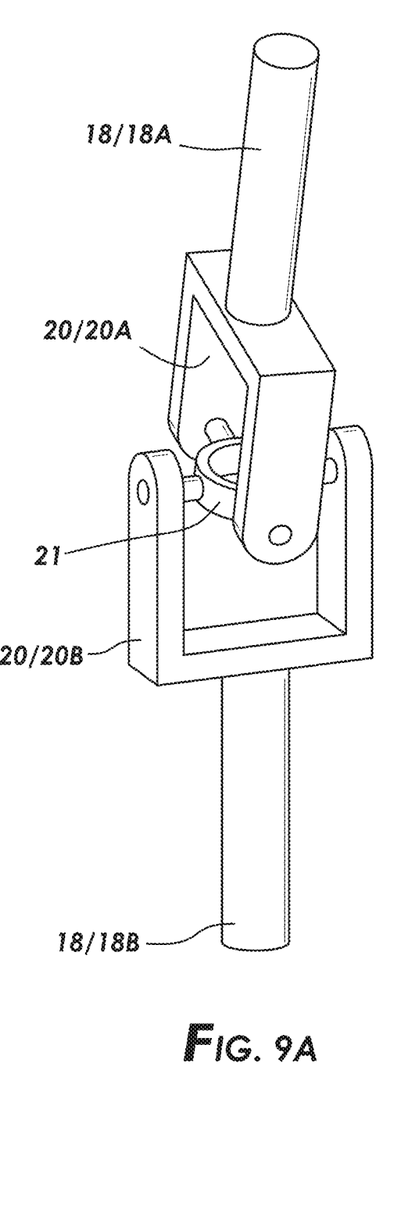
FIG. 9A is an illustration of a universal joint which connects shaft portions of the present subterranean electricity-generating system.
Figure 9B:
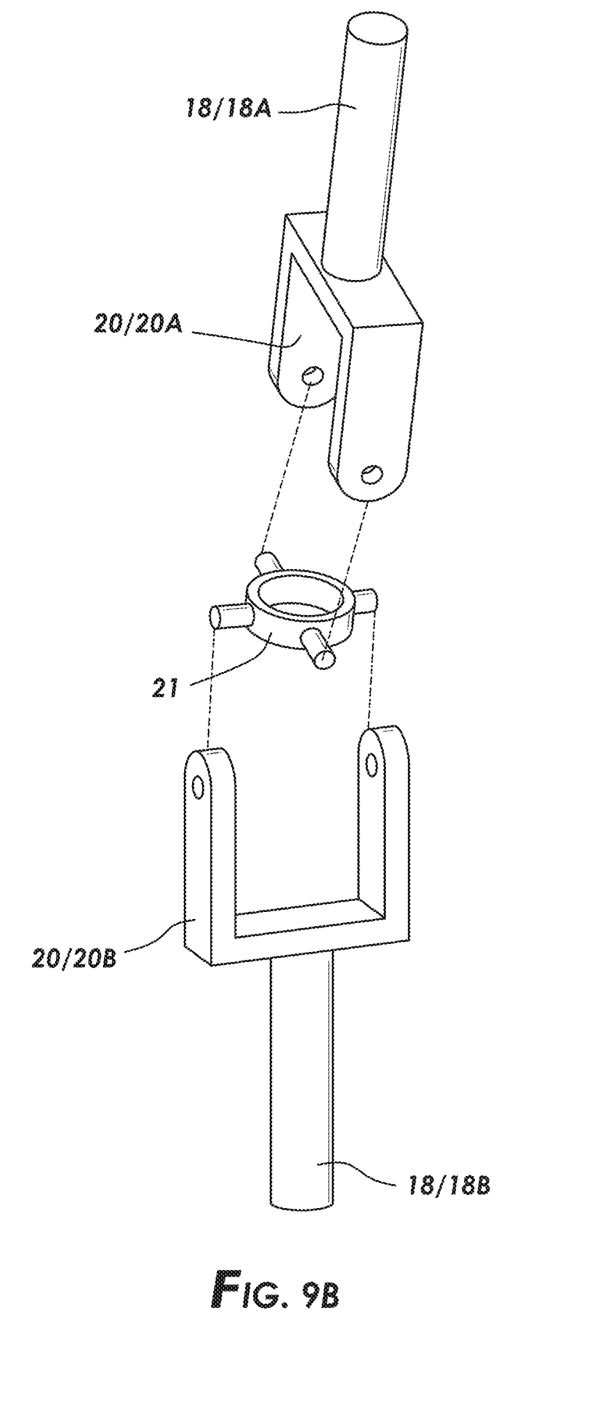
FIG. 9B is an exploded illustration of the universal joint shown in FIG. 9A.

To provide a continuous shaft (5) which drives rotation of the first and second generator rotors (3A)(3B), the shaft (5) can be configured as a plurality of discrete shaft portions (18), such as a shaft first portion (18A) which drives rotation of the first generator rotor (3A) and a shaft second portion (18B) which drives rotation of the second generator rotor (3B), whereby the shaft first and second portions (18A)(18B) may connect to one another to operate as a single unit, for example as a continuous shaft (5). As but one illustrative example, the shaft first and second portions (18A)(18B) can be operably connected with or via a universal joint (19), as known to those of ordinary skill in the art, which facilitates the transmission of power between the two shaft portions (18A)(18B), even if they are not perfectly aligned.

As to particular embodiments, the universal joint (19) can include two yokes (20) (or fork-shaped components), whereby (i) a first yoke (20A) can be coupled to or integrated with an end, such as a lower end, of the shaft first portion (18A), and a second yoke (20B) may be coupled to or integrated with an adjacent end, such as an upper end, of the shaft second portion (18B). The first and second yokes (20A)(20B) can be connected via a spider (or cross) (21). To facilitate smooth rotation, bearings can dispose between the spider (21) and each of the first and second yokes (20A)(20B). In use, when the shaft first portion (18A) is driven to rotate by a driver (17), the rotational force can be transmitted to the first yoke (20A). The spider (21), being connected to both the first and second yokes (20A)(20B), acts as a pivot point which allows the rotational force to be transmitted to the shaft second portion (18B). In this way, a driver (17) can drive simultaneous rotation of the shaft first and second portions (18A)(18B) to simultaneously rotate the first and second generator rotors (3A)(3B).

In use, the shaft (5) and correspondingly the shaft portions (18) can be vertically-oriented and rotate about the vertical rotation axis (6). Thus, to provide the present subterranean electricity-generating system (1), the plurality of generators (2) can dispose in vertical relation to one another to vertically align their rotors (3) and in particular, to vertically align the rotors' pass-throughs (15) through which the shaft (5) comprising its shaft portions (18) extends to dispose the rotor pass-through central axes (16) in parallel relation to and/or coincident with the vertical rotation axis (6). Simply stated, the plurality of generators (2) can be vertically stacked, which notably may minimize the footprint of the present subterranean electricity-generating system (1).

Said specifically, to provide the present subterranean electricity-generating system (1), the first and second generators (2A)(2B) can dispose in vertical relation to one another to vertically align the first and second generator rotors (3A)(3B) and in particular, to vertically align the rotor pass-through (15) of the first generator rotor (3A) and the rotor pass-through (15) of the second generator rotor (3B) through which the shaft (5) comprising the shaft first portion (18A) and the shaft second portion (18B) extends to dispose the rotor pass-through central axes (16) of the first and second generator rotors (3A)(3B) in parallel relation to and/or coincident with the vertical rotation axis (6). Simply stated, the first and second generators (2A)(2B) can be vertically stacked, which notably may minimize the footprint of the present subterranean electricity-generating system (1).

As to particular embodiments, the plurality of generators (2) can dispose in adjacent vertical relation to one another, with minimal space therebetween. As to other particular embodiments, the plurality of generators (2) can dispose in spaced-apart vertical relation to one another.

The present subterranean electricity-generating system (1) includes at least first and second generators (2A)(2B), and can include any practical number of additional generators (2), depending upon the embodiment. For example, particular embodiments of the subterranean electricity-generating system (1) can include: two generators (2), three generators (2), four generators (2), five generators (2), six generators (2), seven generators (2), eight generators (2), nine generators (2), ten generators (2), and so on.

The plurality of generators (2) of the present subterranean electricity-generating system (1) can have the same, similar, or different configurations, depending upon the embodiment.

The plurality of generators (2) of the present subterranean electricity-generating system (1) can have the same, similar, or different dimensions (such as width, diameter, length, height, depth, etc.), depending upon the embodiment.

As to particular embodiments, the shaft (5) rotatably coupled to the plurality of generators (2) of the present subterranean electricity-generating system (1) can be driven by only one driver (17). As to other particular embodiments, the shaft (5) rotatably coupled to the plurality of generators (2) of the present subterranean electricity-generating system (1) can be driven by a plurality of drivers (17), which may be the same, similar, or different, depending upon the embodiment.

The plurality of generators (2) of the present subterranean electricity-generating system (1) can generate a corresponding plurality of electric currents (7) which may be directed to the surface (8) via conductors (such as wires, cables, conductive posts, or the like) for use thereof. The plurality of generators (2) can be electrically connected via a numerous and wide variety of electrical configurations, depending upon the embodiment. As but one illustrative example, the plurality of generators (2) can be electrically connected via conductive posts coupled to each generator (2). Upon combining the generators (2) to provide the present subterranean electricity-generating system (1) (such as upon vertical stacking of the generators (2)), the posts may electrically connect and facilitate the flow of generated electricity.

Figure 8A:
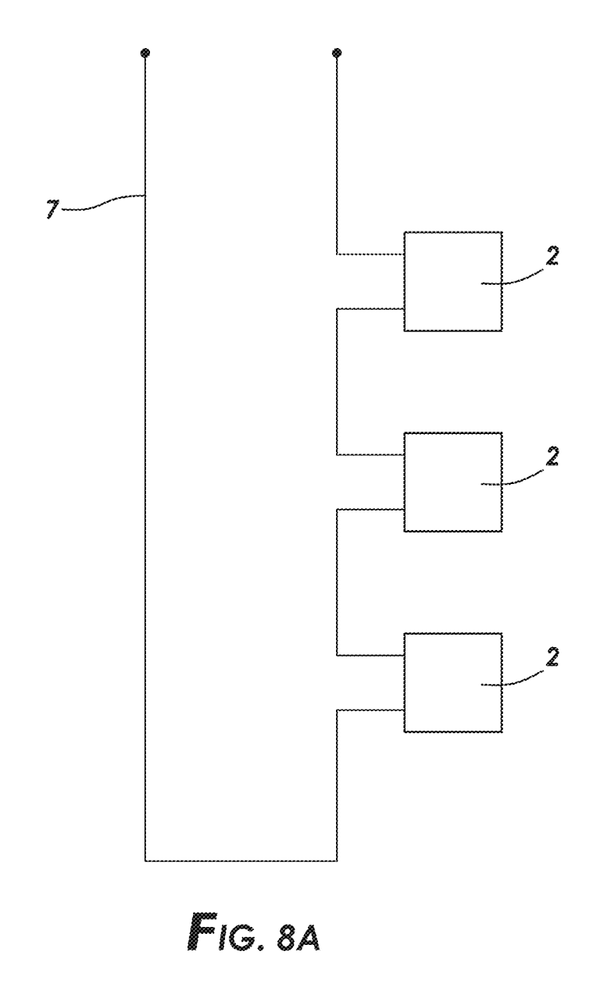
FIG. 8A is an illustration of an electrical connection in series.

As to particular embodiments, the plurality of generators (2) can be electrically connected in series to achieve the desired output, such as but not limited to via the configuration shown in FIG. 8A.

Figure 8B:
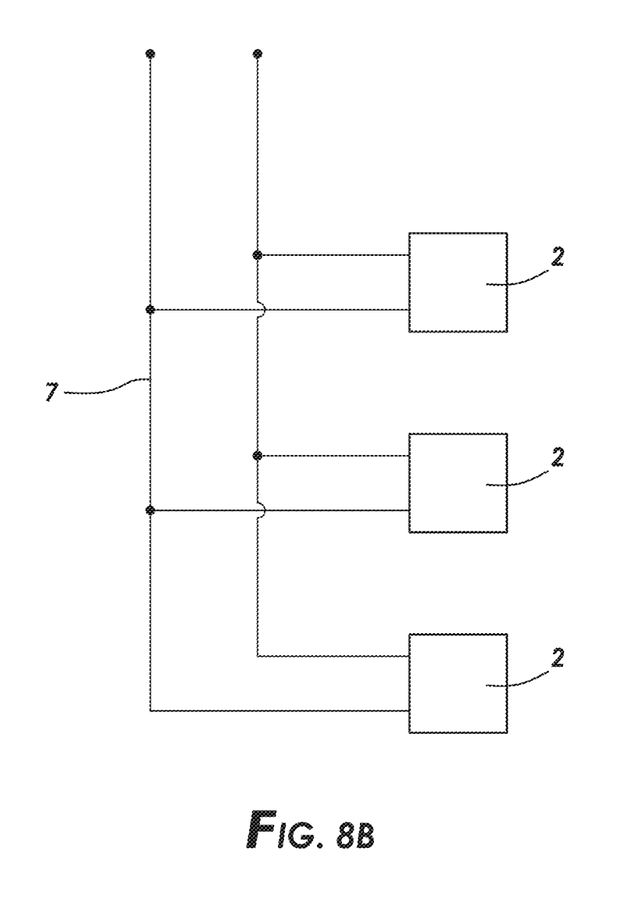
FIG. 8B is an illustration of an electrical connection in parallel.

As to particular embodiments, the plurality of generators (2) can be electrically connected in parallel to achieve the desired output, such as but not limited to via the configuration shown in FIG. 8B.

Location and Operation

As to particular embodiments, at least some of the plurality of generators (2) of the present subterranean electricity-generating system (1) can be configured for subterranean location and operation. Correspondingly, in use, at least some of the plurality of generators (2) of the present subterranean electricity-generating system (1) can dispose underground. Notably, such a location can minimize the surface visibility of the generators (2).

Now referring primarily to FIG. 1, as to particular embodiments, all of the plurality of generators (2) of the present subterranean electricity-generating system (1) can be configured for subterranean location and operation. Correspondingly, in use, all of the plurality of generators (2) of the present subterranean electricity-generating system (1) can dispose underground.

In use, the generators (2) can dispose in or be accommodated by or be contained in an underground container (22), whereby as used herein the term "container" may mean one that contains something or keeps something within limits, whereby a container (22) can be synonymous with a receptacle. The present container (22), which disposes underground, can be vertically-oriented, meaning that the length (or depth) of the container (22) can dispose generally vertically (or at about −90°) relative to a horizontal reference plane (which disposes at about 0°). As to particular embodiments, the ground surface (8) can provide the horizontal reference plane. The vertically-oriented container (22) can be embodied by or synonymous with a vertical bore hole (or borehole), a vertical well bore (or wellbore), a vertical shaft, a vertical chamber, or the like. For the sake of simplicity, the vertically-oriented container (22) will hereinafter be generally referred to as a vertical hole (22).

As to particular embodiments, the vertical hole (22) can be cased, such as via casing (23). As but one illustrative example, the casing (23) can be a pipe, for example a steel pipe, whereby the pipe may but need not necessarily be cylindrical. The casing (23) can have many functions, whereby a primary one may be to provide a strong, stable lining which prevents the vertical hole (22) from collapsing. As to particular embodiments, cement (24) can laterally surround the casing (23) to secure it in place, providing a strong and impermeable barrier. Following, the present subterranean electricity-generating system (1) can be located and operated in a vertical hole (22) which is cased and cemented in place.

As to particular embodiments, the vertical hole (22) can be an existing hole, for example a minimally productive, non-productive, orphaned, or abandoned well bore, such as from the oil, gas, or coal bed methane industry, thereby reusing, repurposing, and/or retrofitting the well bore and its infrastructure. Additionally, the present subterranean electricity-generating system (1) can function to plug the well bore.

As to other particular embodiments, a new hole can be dug, such as via drilling, to provide the vertical hole (22).

Regarding assembly and installation, the plurality of generators (2) can be operably coupled on the surface (8); for example, the rotors (3) can be mechanically coupled via coupling of their respective shaft portions (18), and the generators (2) can be electrically coupled to facilitate transfer of their generated electricity to the surface (8). Regarding installation, following assembly, the plurality of generators (2) can be lowered into the vertical hole (22) and anchored (if necessary).

As to particular embodiments, the driver (17) can be configured for disposition above the plurality of generators (2). As to particular embodiments, at least a portion of the driver (17) can be configured for disposition above the plurality of generators (2). As to particular embodiments, substantially the entirety or the entirety of the driver (17) can be configured for disposition above the plurality of generators (2).

As to particular embodiments, the entirety of the driver (17) can dispose underground, above the plurality of generators (2).

As to particular embodiments, a first portion of the driver (17) can dispose underground and a second portion of the driver can dispose aboveground, above the plurality of generators (2).

As to particular embodiments, the driver (17) can dispose proximate the surface (8), above the plurality of generators (2).

As to particular embodiments, the driver (17) can dispose on the surface (8), above the plurality of generators (2).

As to particular embodiments, the entirety of the driver (17) can dispose aboveground, above the plurality of generators (2).

Now regarding production, a method of making the present subterranean electricity-generating system (1) can include providing a first generator (2A) including a first generator rotor (3A) and a first generator stator (4A); providing a second generator (2B) comprising a second generator rotor (3A) and a second generator stator (4A); and operably coupling a rotatable shaft (5) to the first generator rotor (3A) and the second generator rotor (3B) to drive rotation thereof. The shaft (5) includes a vertical rotation axis (6). Rotation of the shaft (5) drives rotation of the first generator rotor (3A) relative to the first generator stator (4A) to induce a first electric current (7A), and rotation of the shaft (5) drives rotation of the second generator rotor (3B) relative to the second generator stator (4B) to induce a second electric current (7B).

As to particular embodiments, the method can further include operably coupling a driver (17) to the shaft (5) to drive rotation thereof.

As to particular embodiments, the method can further include disposing the first and second generators (2A)(2B) underground.

As to particular embodiments, the method can further include providing at least one additional generator (2) and operably coupling the shaft (5) to its rotor (3).

The method of making the present subterranean electricity-generating system (1) can further include providing and coupling additional components of the system (1), as described above and in the claims.

Now regarding employment, a method of using the present subterranean electricity-generating system (1) can include obtaining said system (1) and rotating the shaft (5) to induce the first electric current (7A) and the second electric current (7B).

As to particular embodiments, the method can further include driving rotation of a driver (17) which drives rotation of the shaft (5).

As to particular embodiments, the method can further include operating the first and second generators (2A)(2B) underground.

As to particular embodiments, the method can further include transferring the first and second electric currents (7A)(7B) to the surface (8) of the earth.

As to particular embodiments, the method can further include storing the generated electricity.

As to particular embodiments, the method can further include using the generated electricity.

As can be easily understood from the foregoing, the basic concepts of the present invention may be embodied in a variety of ways. The invention involves numerous and varied embodiments of a subterranean electricity-generating system and method for making and using the same.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "generator" should be understood to encompass disclosure of the act of "generating"—whether explicitly discussed or not—and, conversely, were there effectively disclosure of the act of "generating," such a disclosure should be understood to encompass disclosure of a "generator" and even a "means for generating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the systems and methods for subterranean electricity generation herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A subterranean electricity-generating system, comprising:
   a first generator comprising a first generator rotor and a first generator stator;
   a second generator comprising a second generator rotor and a second generator stator;
   wherein said first and second generators are configured to dispose below a ground surface in a vertical hole of a well bore;
   a rotatable shaft operably coupled to said first generator rotor and said second generator rotor to drive rotation thereof;
   wherein said shaft comprises a vertical rotation axis; and
   a driver which directly drives rotation of said shaft;
   wherein said driver is configured to dispose at or above said ground surface:
   wherein rotation of said shaft drives rotation of said first generator rotor relative to said first generator stator to induce a first electric current; and
   wherein rotation of said shaft drives rotation of said second generator rotor relative to said second generator stator to induce a second electric current.

2. The system of claim 1, wherein said first and second generator rotors rotate about said vertical rotation axis.

3. The system of claim 1, wherein said shaft is continuous between opposing shaft first and second ends.

4. The system of claim 1, wherein said shaft comprises a plurality of discrete shaft portions.

5. The system of claim 4, wherein said shaft portions connect to one another to operate as a single unit.

6. The system of claim 4, wherein said shaft portions are connected to one another via a joint.

7. The system of claim 6, wherein said shaft portions are connected to one another via a universal joint.

8. The system of claim 1, wherein said first and second generators are vertically stacked.

9. The system of claim 1, wherein said second generator rotor is vertically aligned with said first generator rotor.

10. The system of claim 1, wherein said vertical hole is cased.

11. The system of claim 1, wherein said well bore comprises an abandoned well bore.

12. The system of claim 1, wherein said well bore comprises an orphaned well bore.

13. The system of claim 1, wherein said well bore comprises a non-productive well bore.

14. The system of claim 1, wherein said first and second electric currents are directed to said ground surface via conductors.

15. The system of claim 14, wherein electricity generated by said first and second generators is transferred to said ground surface for use thereon or storage thereof.

* * * * *